US009851805B2

(12) United States Patent
Levesque et al.

(10) Patent No.: US 9,851,805 B2
(45) Date of Patent: Dec. 26, 2017

(54) SYSTEMS AND METHODS FOR HAPTICALLY-ENABLED HOLDERS

(71) Applicant: Immersion Corporation, San Jose, CA (US)

(72) Inventors: Vincent Levesque, Montreal (CA); Juan Manuel Cruz-Hernandez, Montreal (CA); Abdelwahab Hamam, Montreal (CA)

(73) Assignee: Immersion Corporation, San Jose, CA (US)

( * ) Notice: Subject to any disclaimer, the term of this patent is extended or adjusted under 35 U.S.C. 154(b) by 118 days.

(21) Appl. No.: 14/582,457

(22) Filed: Dec. 24, 2014

(65) Prior Publication Data

US 2016/0187988 A1    Jun. 30, 2016

(51) Int. Cl.
*G06F 3/01* (2006.01)
*F16M 11/18* (2006.01)
(Continued)

(52) U.S. Cl.
CPC .......... *G06F 3/017* (2013.01); *A63F 13/2145* (2014.09); *A63F 13/285* (2014.09); *B06B 1/02* (2013.01); *F16M 11/043* (2013.01); *F16M 11/06* (2013.01); *F16M 11/18* (2013.01); *F16M 11/2007* (2013.01); *F16M 13/00* (2013.01); *F16M 13/04* (2013.01); *G06F 1/1601* (2013.01); *G06F 1/166* (2013.01); *G06F 1/1632* (2013.01); *G06F 3/016* (2013.01); *G09G 5/003* (2013.01); *H04M 19/047* (2013.01); *A63F 2300/1037* (2013.01); *G06F 2203/013* (2013.01); *G06F 2203/014* (2013.01)

(58) Field of Classification Search
CPC .......... G06F 2203/013–2203/015; G06F 3/016
See application file for complete search history.

(56) References Cited

U.S. PATENT DOCUMENTS 6,160,540 A    12/2000  Fishkin et al.
6,339,419 B1 *  1/2002  Jolly ....................... G06F 3/011
                                                    244/223
(Continued)

FOREIGN PATENT DOCUMENTS

DE    10 2013 008 644    11/2014
JP       2004-235687       8/2004
(Continued)

OTHER PUBLICATIONS

European Patent Office, Extended European Search Report, Application No. 15200960 dated May 10, 2016.
(Continued)

*Primary Examiner* — Chad Dicke
(74) *Attorney, Agent, or Firm* — Kilpatrick Townsend & Stockton LLP

(57) ABSTRACT

One illustrative system disclosed herein includes a processor configured to: receive a signal; determine a haptic effect based at least in part on the signal; and transmit a haptic signal associated with the haptic effect. The system further includes a haptic output device in communication with the processor and coupled to a holder, wherein the holder is configured to mechanically couple with an electronic device. The haptic output device is configured to receive the haptic signal and output the haptic effect.

33 Claims, 7 Drawing Sheets

(51) Int. Cl.

| | | |
|---|---|---|
| F16M 13/00 | (2006.01) | |
| G06F 1/16 | (2006.01) | |
| H04M 19/04 | (2006.01) | |
| G09G 5/00 | (2006.01) | |
| F16M 11/04 | (2006.01) | |
| F16M 11/06 | (2006.01) | |
| F16M 11/20 | (2006.01) | |
| F16M 13/04 | (2006.01) | |
| A63F 13/2145 | (2014.01) | |
| A63F 13/285 | (2014.01) | |
| B06B 1/02 | (2006.01) | |

(56) References Cited

U.S. PATENT DOCUMENTS

| | | | |
|---|---|---|---|
| 6,477,448 B1 | 11/2002 | Maruyama | |
| 8,834,272 B2* | 9/2014 | Bleich | A63F 13/02 463/30 |
| 9,317,121 B2* | 4/2016 | Park | G06F 3/016 |
| 2001/0035668 A1* | 11/2001 | Gaffney | A47C 1/0345 297/85 M |
| 2002/0097223 A1* | 7/2002 | Rosenberg | A63F 13/06 345/157 |
| 2004/0008191 A1 | 1/2004 | Poupyrev et al. | |
| 2004/0093968 A1* | 5/2004 | Oster | G01D 11/16 74/10.2 |
| 2004/0108995 A1 | 6/2004 | Hoshino et al. | |
| 2004/0164971 A1* | 8/2004 | Hayward | G06F 3/03547 345/179 |
| 2006/0066574 A1* | 3/2006 | Kim | G05G 7/02 345/161 |
| 2008/0024440 A1 | 1/2008 | Olien et al. | |
| 2008/0024463 A1 | 1/2008 | Pryor | |
| 2008/0042986 A1 | 2/2008 | Westerman et al. | |
| 2008/0143693 A1 | 6/2008 | Schena | |
| 2008/0303782 A1 | 12/2008 | Grant et al. | |
| 2009/0051509 A1 | 2/2009 | Hwang | |
| 2009/0296341 A1* | 12/2009 | Eldershaw | G06F 1/1626 361/679.43 |
| 2010/0056223 A1 | 3/2010 | Choi et al. | |
| 2010/0149111 A1 | 6/2010 | Olien et al. | |
| 2010/0177064 A1* | 7/2010 | Cragun | G06F 3/011 345/184 |
| 2011/0115754 A1* | 5/2011 | Cruz-Hernandez | G05G 1/08 345/184 |
| 2012/0019440 A1* | 1/2012 | Berkley | G06F 3/0346 345/156 |
| 2012/0141949 A1* | 6/2012 | Bodony | A61C 9/0053 433/29 |
| 2012/0176315 A1* | 7/2012 | Cordes | G06F 3/016 345/161 |
| 2012/0242462 A1* | 9/2012 | Nagara | G06F 1/1632 340/407.1 |
| 2013/0050112 A1* | 2/2013 | Vanhelle | B60K 37/06 345/173 |
| 2013/0201115 A1 | 8/2013 | Heubel | |
| 2014/0056461 A1 | 2/2014 | Afshar | |
| 2014/0173155 A1* | 6/2014 | Slattery | G06F 13/4081 710/303 |
| 2014/0229007 A1* | 8/2014 | Kishi | A61B 19/2203 700/257 |
| 2014/0242911 A1* | 8/2014 | Holtman | G06F 1/1632 455/41.1 |
| 2014/0320431 A1 | 10/2014 | Cruz-Hernandez et al. | |
| 2014/0354570 A1* | 12/2014 | Makinen | G06F 3/041 345/173 |
| 2016/0028868 A1* | 1/2016 | Scholz | G01C 21/26 455/569.2 |
| 2016/0101716 A1* | 4/2016 | Brecht | B64D 11/0646 297/397 |
| 2016/0170508 A1* | 6/2016 | Moore | G09B 21/003 345/173 |
| 2016/0173667 A1* | 6/2016 | Torres Gutierrez | H02J 7/0054 455/575.1 |
| 2016/0179128 A1* | 6/2016 | Guglielmo | B66F 11/04 182/19 |

FOREIGN PATENT DOCUMENTS

| | | |
|---|---|---|
| JP | 2006-325323 | 11/2006 |
| JP | 2008-282125 | 11/2008 |
| WO | WO 2013/004919 A1 | 1/2013 |
| WO | WO 2014/055436 | 4/2014 |

OTHER PUBLICATIONS

U.S. Appl. No. 14/512,719, filed Oct. 13, 2014, Levesque et al.

Chubb et al., ShiverPaD: A Glass Haptic Surface That Produces Shear Force on a Bare Finger. EEE Trans. Haptics 3, 3 (Jul. 2010), 189-198.

Poupyrev, I., Gummi, http://www.ivanpoupvrev.com/projects/gummi.php, last downloaded on Dec. 12, 2014.

Roudaut et al., Gesture output: eyes-free output using a force feedback touch surface. In Proceedings of the SIGCHI Conference on Human Factors in Computing Systems (CHI '13). ACM, New York, NY, USA, 2547-2556, 2013.

Sinclair et al., "TouchMover 2.0—3D touchscreen with force feedback and haptic texture," Haptics Symposium (HAPTICS), 2014 IEEE, vol., No., pp. 1,6, Feb. 23-26, 2014.<.

Sinclair et al., TouchMover: actuated 3D touchscreen with haptic feedback. In Proceedings of the 2013 ACM international conference on Interactive tabletops and surfaces (ITS '13). ACM, New York, NY, USA, 287-296, 2013.

Buru-Navi : Being pulled illusion (Introduction movie), web site available at https://www.youtube.com/watch?v=Yj_WnNWV8F4, uploaded on Nov. 5, 2010.

Dotson, K., Mophie Pulse Brings Shake, Rattle, and Roll to the iPod Touch, web page at http://siliconangle.com/blog/2011/01/06/mophie-pulse-brings-shake-rattle-and-roll-to-the-ipod-touch/, dated Jan. 6, 2011.

Mophie, Juice Pack Pulse, User Manual—Made for iPod touch 4$^{th}$ Generation, 2012.

European Patent Application No. 15200960, Examiner's Report dated Mar. 3, 2017.

* cited by examiner

SYSTEMS AND METHODS FOR HAPTICALLY-ENABLED HOLDERS

FIELD OF THE INVENTION

The present invention relates to the field of user interface devices. More specifically, the present invention relates to haptically-enabled holders.

BACKGROUND

As computer-based systems become more prevalent, the quality of the interfaces through which humans interact with these systems is becoming increasingly important. Often, users rely on external devices to improve their interaction with computer-based systems. For example, users may use stands, docks, cases, and other holders to aid in their use of such systems. For instance, a user may use a stand to position a tablet at a comfortable viewing angle to watch a movie. Moreover, the systems themselves may use a variety of techniques to improve user experience, such as providing audio and visual feedback. It may also be desirable to provide haptic feedback (e.g., mechanical vibrations). However, some systems may lack haptic feedback capabilities. Thus, it may be desirable to provide systems and methods to allow such computer-based systems to generate haptic feedback.

SUMMARY

Embodiments of the present disclosure comprise haptically-enabled holders. In one embodiment, a system of the present disclosure may comprise: a processor configured to: receive a signal; determine a haptic effect based at least in part on the signal; and transmit a haptic signal associated with the haptic effect. The system may further comprise a haptic output device in communication with the processor and coupled to a holder, wherein the holder is configured to mechanically couple with an electronic device. The haptic output device may be configured to receive the haptic signal and output the haptic effect.

In another embodiment, a method of the present disclosure may comprise: receiving a signal; determining a haptic effect based at least in part on the signal; and transmitting a haptic signal associated with the haptic effect to a haptic output device. The haptic output device may be coupled to a holder configured to mechanically couple with an electronic device. The haptic output device may be configured to receive the haptic signal and output the haptic effect. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
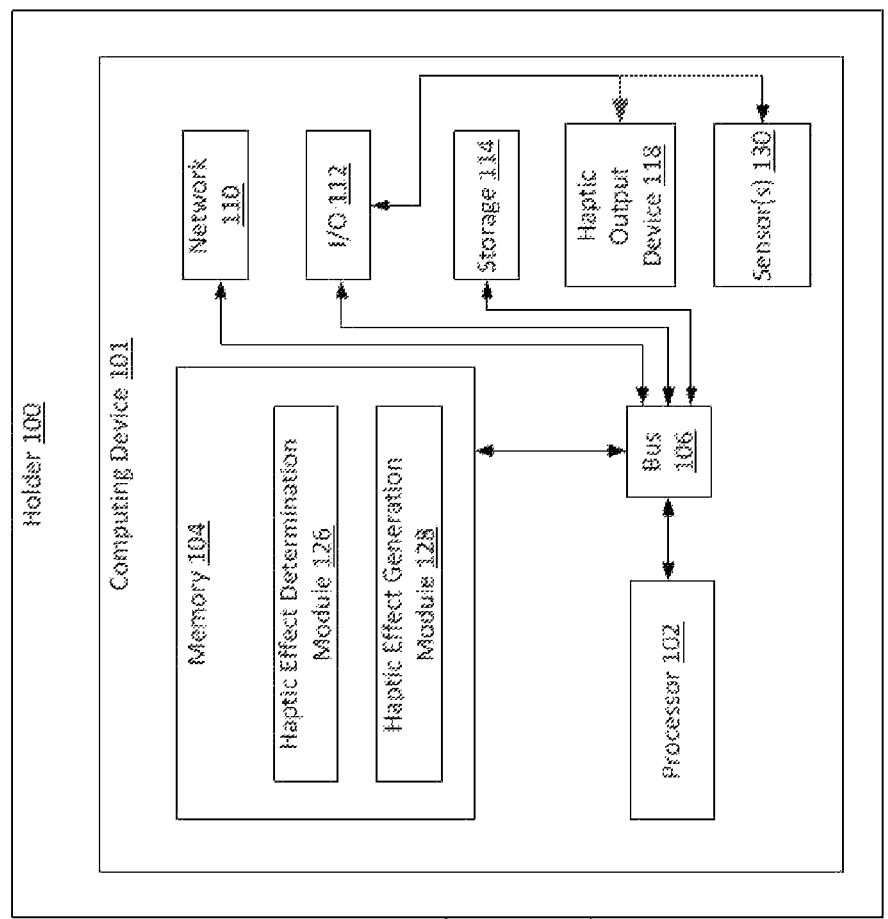
FIG. 1 is a block diagram showing a system for haptically-enabled holders according to one embodiment.
Figure 1:
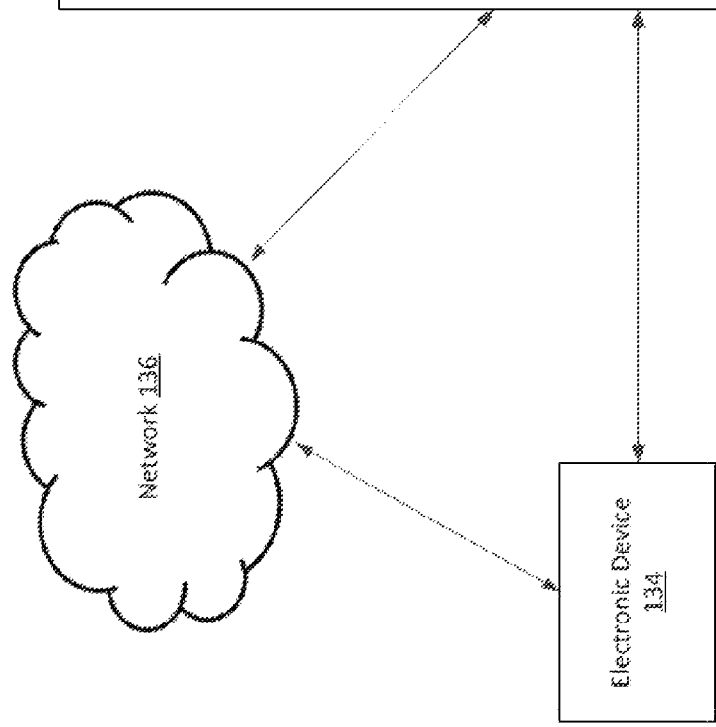

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Haptically-Enabled Holders

One illustrative embodiment of the present disclosure comprises an electronic device, such as a tablet, e-reader, or mobile phone. The electronic device comprises a touch-screen display, a memory, and a processor in communication with each of these elements.

In the illustrative embodiment, the electronic device is physically (e.g., mechanically) coupled to a holder. A holder, as used herein, comprises a stand (e.g., a kickstand, wall mount, or an origami stand), case, docking station (e.g., a device that may include one or more connections to external peripheral devices), or other device configured to hold an object (e.g., the electronic device). For example, the holder may comprise a stand configured to orient the electronic device in an upright position on a surface (e.g., a table or desk).

In the illustrative embodiment, the holder comprises a computing device in wired or wireless communication with the electronic device. The computing device comprises a memory, a processor, and a haptic output device. The computing device is configured to receive a signal from the electronic device and, based on the signal, output a haptic effect to the user via the haptic output device.

In the illustrative embodiment, the electronic device is configured to transmit the signal upon the occurrence of an event. For example, the electronic device may transmit a signal to the computing device upon a user interacting with (e.g., tapping, touching, or gesturing on) a virtual object (e.g., a slider, button, or widget) that is output on the touch-screen display. The computing device may receive the signal and output a haptic effect (e.g., a short vibration). Thus, haptic effects can be provided to users via holders, even if the electronic device itself does not contain a haptic output device. This may increase the number and nature of devices capable of outputting haptic effects to users.

Further, in the illustrative embodiment, the holder acts as an intermediary that physically couples the electronic device to a mechanical ground. A mechanical ground, as used herein, comprises earth ground itself, any device mechanically coupled to earth ground (e.g., a table, desk, chair, floor, or piece of furniture), and/or a user (e.g., a user's hand, foot, arm, or leg). For example, a stand can act as an intermediary that couples the electronic device to a desk (e.g., the mechanical ground). As another example, a user can hold a stand, which may act as an intermediary that couples the electronic device to a user's hand (e.g., the mechanical ground). This coupling can allow the holder to deliver kinesthetic haptic effects to the user through the electronic device. Kinesthetic haptic effects may be associated with device movements.

For example, in some embodiments, the holder may comprise a docking station. The docking station may have wheels and may be resting on a surface (e.g., a desk). In the illustrative embodiment, the electronic device detects a user pressing against a virtual object (e.g., a virtual button) output on the touch-screen display and causes the computing device to output a haptic effect. In some embodiments, the haptic effect may comprise actuating the wheels in one or more directions (e.g., toward the user, away from the user, to the right of the user, or to the left of the user). For example, the haptic effect may comprise moving the holder and the electronic device coupled to the holder away from the user and then back toward the user in a quick back-and-forth motion. This back-and-forth motion may simulate pressing a physical button.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptically-Enabled Holders

FIG. 1 is a block diagram showing a system for a haptically-enabled holder according to one embodiment. The system comprises an electronic device 134. In some embodiments, the electronic device 134 may comprise a mobile phone (e.g., a smartphone), portable media player (e.g., a MP3 player), tablet, e-reader, laptop computer, and/or a portable gaming device. In some embodiments, the electronic device 134 may comprise a display, computer monitor, and/or a television. For example, the electronic device 134 may comprise a computer monitor configured to couple with a laptop or desktop computer. Alternatively the electronic device may comprise a television configured to receive signals from, e.g., a cable box, an internet connected device, a video player, an antenna, or some other video signal generation means known in the art.

The system also comprises a holder 100. A holder 100 may comprise any device configured to directly or indirectly mechanically couple with an electronic device 134 for holding, positioning, orienting, protecting, and/or otherwise improving the usability of the electronic device 134. For example, a holder 100 may comprise a stand, a docking station, or a case. In some embodiments, the holder 100 may be separate from and coupleable to the electronic device 134. In other embodiments, the holder 100 may be a part of or otherwise permanently coupled to the electronic device 134. For instance, the holder 100 may comprise a stand that is a permanent part of the electronic device 134, sometimes referred to as a "kickstand."

The holder 100 comprises a computing device 101. In some embodiments, the components (e.g., the processor 102, network 110, sensor 130, and haptic output device 118) of the computing device 101 may be integrated into a single housing (e.g., of the holder 100). In other embodiments, the components may be distributed (e.g., among multiple housings or locations) and in electrical communication with one another.

The computing device 101 may or may not comprise all of the components depicted in FIG. 1. For example, in some embodiments, the holder 100 may comprise a mount and/or stand for a display. In such an embodiment, the computing device 101 coupled to the holder 100 may not comprise the sensors 130 and/or the I/O components 112. As another example, in some embodiments, the computing device 101 may comprise the network components 110 and the haptic output device 118, and none of the remaining components shown in FIG. 1. In one such embodiment, the network components 110 may receive wired or wireless signals from the electronic device 134 and actuate the haptic output device 118.

The computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network interface device 110 can represent one or more of any components that facilitate a network connection or otherwise facilitate communication between devices (e.g., electronic device 134 and computing device 101). Examples include, but are not limited to, wired interfaces such as Ethernet, USB, IEEE 1394, and/or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some embodiments, the computing device 101 may communicate directly with the electronic device 134 (e.g., via Bluetooth or a wired interface). In other embodiments, the computing device 101 and electronic device 134 may be connected to a network 136. The electronic device 134 may communicate with the computing device 101 via the network 136. The network 136 may be any suitable number or type of networks or links, including, but not limited to, a dial-up network, a local area network (LAN), wide area network (WAN), public switched telephone network (PSTN), a cellular network, a WiFi network, the Internet, an intranet or any combination of hard-wired and/or wireless communication links. In some embodiments, the network 136 is a single network. In other embodiments, the network 136 may comprise two or more networks.

I/O components 112 may be used to facilitate connection to devices such as one or more displays, touch sensitive surfaces 116, keyboards, mice, speakers, microphones, buttons, and/or other hardware used to input data or output data. For instance, in some embodiments, the holder 100 comprises a docking station, e.g., for a laptop computer, mobile device, tablet, or e-reader. In such an embodiment, the I/O components 112 may facilitate connection to external peripheral devices, such as a display, a keyboard, and/or a mouse. Storage 114 represents nonvolatile storage such as read-only memory, flash memory, ferroelectric RAM (F-RAM), magnetic, optical, or other storage media included in the computing device 101 or coupled to processor 102.

The computing device 101 may further comprise one or more sensor(s) 130. The sensor(s) 130 are configured to transmit sensor signals to the processor 102. In some embodiments, the sensor 130 may comprise, for example, a humidity sensor, ambient light sensor, gyroscope, GPS unit, accelerometer, range sensor, depth sensor, biosensor, camera, or temperature sensor. In some embodiments, the sensor 130 may be external to computing device 101 and in wired or wireless communication with the computing device 101. For example, the sensor 130 may comprise a camera external to and oriented toward the holder 100. The camera may be configured to capture images and wirelessly transmit sensor signals associated with the images to the computing device 101. In some embodiments, the computing device 101 may analyze the images to determine, e.g., if a user is interacting with (e.g., touching, tapping, gesturing on, or gesturing toward) or approaching an electronic device 134 coupled to the holder 100.

The computing device 101 comprises a haptic output device 118. The haptic output device 118 may be in communication with processor 102. The haptic output device 118 is configured to output a haptic effect in response to a haptic signal. In some embodiments, the haptic output device 118 is configured to output a haptic effect comprising a vibration, a change in a perceived coefficient of friction, a simulated texture, a change in temperature, a stroking sensation, an electro-tactile effect, or a surface deformation (e.g., a deformation of a surface associated with the computing device 101 or the holder 100). Further, some haptic effects may use multiple haptic output devices 118 of the same or different types in sequence and/or in concert. Although a single haptic output device 118 is shown in FIG. 1, embodiments may use multiple haptic output devices 118 of the same or different type to produce haptic effects.

In some embodiments, the haptic output device 118 is external to computing device 101 and in communication with the computing device 101 (e.g., via wired interfaces such as Ethernet, USB, IEEE 1394, and/or wireless interfaces such as IEEE 802.11, Bluetooth, or radio interfaces). For example, the computing device 101 may be positioned external to the holder 100 and the haptic output device 118 may be positioned internal to the holder 100. The haptic output device 118 may be configured to receive haptic signals from the computing device 101.

In some embodiments, the haptic output device 118 is configured to output a haptic effect comprising a vibration. The haptic output device 118 may comprise, for example, one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 is configured to output a haptic effect modulating the perceived coefficient of friction of a surface associated with the haptic output device 118. In one embodiment, the haptic output device 118 comprises an ultrasonic actuator. An ultrasonic actuator may vibrate at an ultrasonic frequency, for example 20 kHz, reducing the perceived coefficient of an associated surface. In some embodiments, the ultrasonic actuator may comprise a piezo-electric material.

In some embodiments, the haptic output device 118 uses electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101 and/or electronic device 134. In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger, head, foot, arm, shoulder, leg, or other body part, or a stylus) near or touching the haptic output device 118. Varying the levels of attraction between the object and the conducting layer can vary the haptic effect perceived by a user.

In some embodiments, the haptic output device 118 comprises a deformation device configured to output a deformation haptic effect. The deformation haptic effect may comprise raising or lowering portions of a surface associated with the holder 100 and/or electronic device 134. For example, the haptic effect may comprise raising portions of a surface of the holder 100 to generate a bumpy texture. In some embodiments, the deformation haptic effect may comprise bending, folding, rolling, twisting, squeezing, flexing, changing the shape of, or otherwise deforming a surface associated with the holder 100, the electronic device 134, and/or a user interface device. In one such embodiment, the deformation haptic effect may apply a force on a surface associated with the electronic device 134, which may be deformable. The force may cause the electronic device 134 to bend, fold, roll, twist, squeeze, flex, change shape, or otherwise deform. In another embodiment, the deformation haptic effect may apply a force on the holder 100 configured to cause the holder to bend, e.g., toward or away from the user. For example, if the holder 100 comprises a stand for holding a computer monitor, the deformation haptic effect may cause the stand to bend such that the computer monitor moves toward or away from the user.

In some embodiments, the haptic output device 118 comprises fluid (e.g., a liquid or gas) configured for outputting a haptic effect (e.g., for bending or deforming a surface associated with the holder 100 and/or electronic device 134). For example, the fluid may comprise a smart gel. A smart gel comprises a fluid with mechanical or structural properties that change in response to a stimulus or stimuli (e.g., an electric field, a magnetic field, temperature, ultraviolet light, shaking, or a pH variation). For instance, in response to a stimulus, a smart gel may change in stiffness, volume, transparency, and/or color. In some embodiments, stiffness may comprise the resistance of a surface associated with the holder 100 and/or electronic device 134 against deformation. In some embodiments, one or more wires may be embedded in or coupled to the smart gel. As current runs through the wires, heat is emitted, causing the smart gel to expand or contract. This may move a surface associated with the holder 100 and/or electronic device 134, generating the haptic effect.

As another example, the fluid may comprise a rheological (e.g., a magneto-rheological or electro-rheological) fluid. A rheological fluid comprises metal particles (e.g., iron particles) suspended in a fluid (e.g., oil or water). In response to an electric or magnetic field, the order of the molecules in the fluid may realign, changing the overall damping and/or viscosity of the fluid. This may move a surface associated with the holder 100 and/or electronic device 134, generating a haptic effect.

In some embodiments, the haptic output device 118 comprises a mechanical deformation device. For example, in some embodiments, the haptic output device 118 may comprise an actuator coupled to an arm that rotates a deformation component. The deformation component may comprise, for example, an oval, starburst, or corrugated shape. The deformation component may be configured to move a surface associated with the holder 100 and/or the electronic device 134 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In such an embodiment, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Further, other techniques or methods can be used to output haptic effects. For example, the haptic output device 118 may comprise a flexible surface layer configured to deform its surface or vary its texture based upon contact from a surface reconfigurable haptic substrate (including, but not limited to, e.g., fibers, nanotubes, electroactive polymers, piezoelectric elements, or shape memory alloys). In some embodiments, the haptic output device 118 outputs a haptic effect via a deforming mechanism (e.g., a motor coupled to wires), air or fluid pockets, local deformation of materials, particle jamming, electromagnets, shape-memory alloys, resonant mechanical elements, piezoelectric materials, micro-electromechanical systems ("MEMS") elements or pumps, thermal fluid pockets, variable porosity membranes, or laminar flow modulation.

In some embodiments, the haptic output device 118 may comprise a motor. For example, the haptic output device 118 may comprise a motor (e.g., a DC motor) configured to pull a wire or cable coupled to a portion of the holder 100. This may cause the holder 100 to bend or otherwise deform. As another example, the haptic output device 118 may comprise a motor coupled to wheels. The haptic output device 118 may drive the wheels to cause the holder 100 to move, e.g., across a surface.

In some embodiments, the haptic output device 118 is configured to remotely project haptic effects to a user. For example, the haptic output device 118 may comprise one or more jets configured to emit materials (e.g., solids, liquids, gasses, or plasmas) toward the user (e.g., toward the back of the user's hand). In one such embodiment, the haptic output device 118 comprises a gas jet configured to emit puffs or streams of oxygen, nitrogen, carbon dioxide, or carbon monoxide with varying characteristics upon receipt of the haptic signal. As another example, the haptic output device 118 may comprise one or more ultrasonic transducers or speakers configured to project pressure waves in the direction of the user. In one such embodiment, upon the user interacting with an object, the processor 102 may cause the haptic output device 118 to emit a concentrated pressure wave toward the user. The concentrated pressure wave may vibrate a portion of the user's body (e.g., the user's hand).

In some embodiments, the haptic output device 118 may be a portion of the housing of the holder 100. In other embodiments, the haptic output device 118 may be housed inside a flexible housing overlaying a surface associated with the holder 100 (e.g., the front or back of the holder 100). For example, the holder 100 may comprise a docking station, which may be positioned on a desk. The haptic output device 118 may comprise a layer of smart gel positioned on the bottom of the docking station (e.g., against the desk). Upon actuating the haptic output device 118 (e.g., with an electric current or an electric field), the smart gel may expand. This may cause the user to perceive a haptic effect comprising movement of the electronic device 134 and/or holder 100 in an upward direction (e.g., off the surface of the desk).

Turning to memory 104, modules 126, 128 are depicted to show how a device can be configured in some embodiments to provide haptically-enabled holders. Haptic effect determination module 126 represents a program component that analyzes data to determine a haptic effect to generate. The haptic effect determination module 126 may comprise code that selects one or more haptic effects to output using one or more algorithms or lookup tables. In some embodiments, the haptic effect determination module 126 comprises one or more algorithms or lookup tables useable by the processor 102 to determine a haptic effect.

In some embodiments, the haptic effect determination module 126 comprises code that determines a haptic effect based on an event. An event, as used herein, is any interaction, action, collision, or other event which occurs during operation of the device (e.g., the electronic device 134 and/or on the computing device 101) which can potentially comprise an associated haptic effect. In some embodiments, an event may comprise user input (e.g., a button press, manipulating a joystick, interacting with a touch-sensitive surface, tilting or orienting the device), a system status (e.g., low battery, low memory, or a system notification, such as a notification generated based on the system receiving an incoming phone call), sending data, receiving data, or a program event (e.g., if the program is a game, a program event may comprise explosions, gunshots, collisions, interactions between game characters, advancing to a new level, or driving over bumpy terrain).

For example, in some embodiments, the processor 102 may receive a sensor signal associated with an event that occurred on the electronic device 134. The event may comprise, for example, the electronic device 134 receiving an incoming phone call. Based on the event, the haptic effect determination module 126 may determine a haptic effect configured to, e.g., actuate a stand coupled to the holder 100. For example, if the electronic device 134 is laying prone on a surface (e.g., a counter), the haptic effect may actuate the stand such that the stand lifts the electronic device 134 into an upright position (e.g., roughly perpendicular to the surface). This may visually notify a user of the incoming call, which may be beneficial if the user is not within earshot of the electronic device's ringer.

In some embodiments, haptic effect determination module 126 comprises code that determines a haptic effect based on a characteristic (e.g., the type, pressure, speed, location, or direction) of a user interaction with the electronic device 134 and/or the holder 100. For example, the haptic effect determination module 126 may determine a haptic effect comprising a pulsed vibration if the user interacts with a touch-sensitive surface (e.g., touch-screen display) of the electronic device 134 at a particular location (e.g., a location associated with a virtual object, such as a button, slider, knob, switch, image, text, or widget). As another example, the haptic effect determination module 126 may determine a haptic effect comprising a long vibration based on a user pressing a physical button on the electronic device 134.

In some embodiments, haptic effect determination module 126 comprises code that determines a haptic effect based on a characteristic (e.g., size, shape, location, texture, color, type, or content) of a virtual object. For example, the electronic device 134 may be executing a video game. In some embodiments, the electronic device 134 may detect a user interaction with a virtual object (e.g., a virtual weapon) and transmit a signal associated with the virtual object to the computing device 101. The computing device 101 may receive the signal and determine a haptic effect based on a characteristic of the virtual object. For example, in the videogame embodiment described above, the haptic effect determination module 126 may determine a haptic effect comprising a high-magnitude vibration if the virtual object is a rocket launcher. Further, in such an embodiment, if the virtual object is a knife, the haptic effect determination module 126 may determine a haptic effect comprising low-magnitude vibration. The different haptic effects may be indicative of the power or force associated with the virtual object (e.g., the virtual weapon).

Haptic effect generation module 128 represents programming that causes processor 102 to generate and transmit haptic signals to the haptic output device 118 to generate the selected haptic effect. For example, the haptic effect generation module 128 may access stored waveforms or commands to send to the haptic output device 118 to create the desired effect. In some embodiments, the haptic effect generation module 128 may comprise algorithms to determine the haptic signal. Further, in some embodiments, haptic effect generation module 128 may comprise algorithms to determine target coordinates for the haptic effect (e.g., coordinates for a location on an electronic device 134 and/or the holder 100 at which to output a haptic effect).

Although the modules 126, 128 are depicted in FIG. 1 as program components within the memory 104, in some embodiments, the modules 126, 128 may comprise hardware. For example, modules 126, 128 may comprise analog to digital converters, processors, microcontrollers, comparators, amplifiers, transistors, and other analog or digital circuitry.

Figure 2:
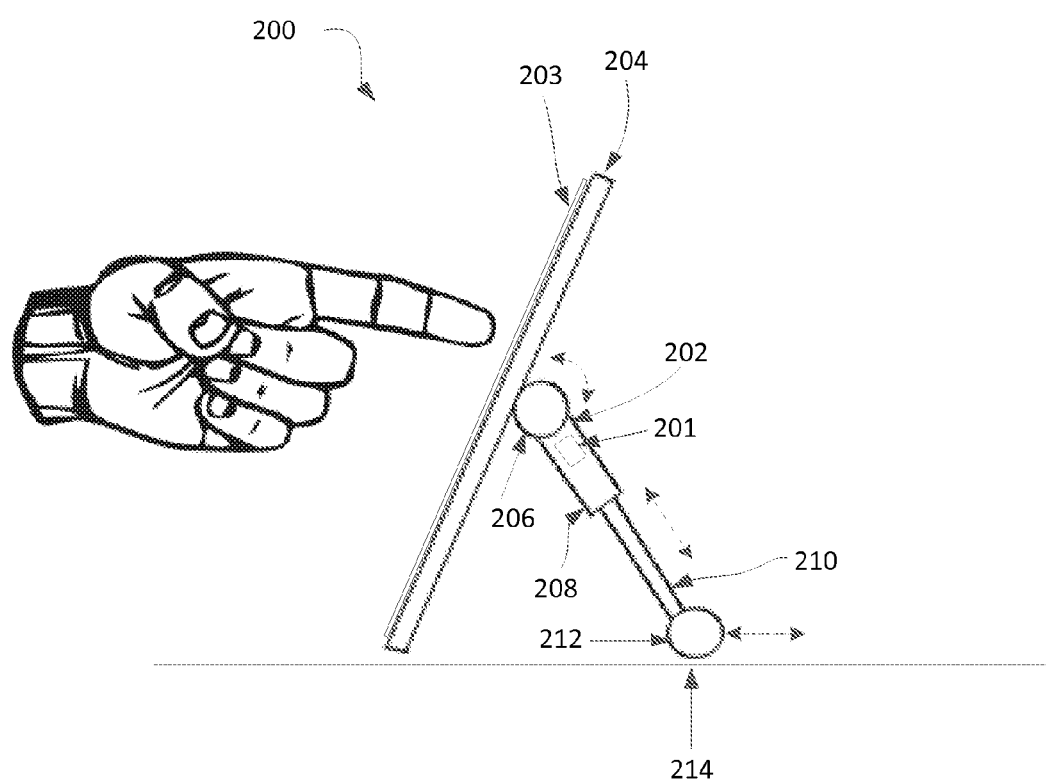
FIG. 2 shows an embodiment of a system for haptically-enabled holders.

FIG. 2 shows an embodiment of a system for haptically-enabled holders. The system 200 comprises an electronic device 204. The electronic device 204 may comprise, for example, a mobile device (e.g., a tablet, mobile phone, or e-reader). In the embodiment shown in FIG. 2, the electronic device 204 comprises a touch-sensitive surface 203 (e.g., a touch-screen display). A user can interact with the touch-sensitive surface 203 to perform various tasks (e.g., check e-mail, browse webpages, play music, watch videos, or play a video game) using the electronic device 204. In some embodiments, the electronic device 204 additionally or alternatively comprises other user interface components, such as a button, joystick, directional pad, trigger, microphone, speaker, and/or switch.

The electronic device 204 is physically coupled to a holder 202. The holder 202 may be configured to orient the electronic device 204 with respect to a surface 214. For example, in the embodiment shown in FIG. 2, the holder 202 comprises a stand configured to orient the electronic device 204 in an upright position on the surface 214. In some embodiments, the holder 202 may comprise one or more straps, snap-in components, cables, screws, bolts, and/or locking devices configured for mechanically coupling with the electronic device 204. The holder 202 may comprise any suitable material, for example, rubber, plastic, and/or metal. In some embodiments, the holder 202 comprises material configured to absorb shock from an impact.

The electronic device 204 is in wired or wireless communication with a computing device 201. In some embodiments, the computing device 201 is coupled to or embedded within the holder 202. The computing device 201 may be configured to receive a signal from the electronic device 204 and output a haptic effect.

In some embodiments, the computing device 201 outputs the haptic effect via one or more haptic output devices. The haptic output devices may be embedded within, coupled to, or make up a housing of the holder 202. The holder 202 may comprise any number or configuration of haptic output devices, and the holder 202 may use any number or combination of haptic output devices to output one or more haptic effects.

In some embodiments, the holder 202 comprises a pivotable component 206 (e.g., a hinge) or a rotatable joint (e.g., a ball and socket joint). The computing device 201 may actuate a haptic output device to pivot and/or rotate, or resist against the pivoting or rotation of, the electronic device about an axis. In one embodiment, the haptic output device comprises a motor coupled to a pivotable component 206 (or a motor coupled to a cable coupled to the pivotable component 206). The computing device 201 may actuate the motor to pivot the electronic device 204 about an axis (e.g., directed out of the page). This may change the angle at which the electronic device 204 rests against the surface 214. In another embodiment, the haptic output device comprises an electromagnet. The computing device 201 may actuate the electromagnet to resist a user from pivoting the pivotable component 206 (or rotating a rotatable joint).

In some embodiments, the holder 202 comprises two or more holder components 208, 210 that are configured to move with respect to one another. For example, the holder 202 may comprise two holder components 208, 210 that are slideably coupled (e.g., configured to slide with respect to one another). In one such embodiment, a first holder component 210 is configured to slide relative to a second holder component 208. In some embodiments, a haptic output device is configured to cause the two or more holder components to move (e.g., slide) or resist moving with respect to one another.

For example, in some embodiments, the haptic output device comprises a linear actuator. The computing device 201 may actuate the linear actuator to linearly extend or retract the holder component 208. This may change the angle at which the electronic device 204 rests against the surface 214. In another embodiment, the haptic output device is configured to vibrate one or both of the holder components 208, 210 (e.g., at high frequencies). The vibrations and the weight of the electronic device 204 and/or holder 202 may overcome friction forces between the holder components 208, 210. This may cause the holder components 208, 210 to move relative to each other.

In still another embodiment, the haptic output device comprises a fluid (e.g., a smart gel or a rheological fluid). The computing device 201 may actuate the haptic output device (e.g., by applying voltage or a magnetic field to the fluid), causing the fluid to expand or contract. This may push or pull on the holder component 210, e.g., moving or resisting movement of the holder components 208, 210 relative to each other.

In yet another embodiment, the haptic output device comprises a piston and a valve. For example, holder component 208 may comprise a valve and holder component 210 may comprise a piston. In such an embodiment, the computing device 201 may actuate the haptic output device by, for example, opening and closing the valve. In some embodiments, closing of the valve may prohibit fluid or air within the valve from moving. This may prevent the piston from moving through the valve. In some embodiments, opening the valve may allow fluid or air to move within the valve. This may allow the holder components 208, 210 to slide relative to each other.

In some embodiments, the haptic output device outputs an electrostatic haptic effect, e.g., configured to increase or reduce friction between holder components 208, 210. This may assist or resist the holder components 208, 210 in moving relating to each other. Other methods, such as particle jamming and/or suction (e.g., generating a suction between holder components 208, 210), may additionally or alternatively be used to assist or resist the holder components 208, 210 in moving relative to each other.

In some embodiments, the holder 202 comprises a rotatable component 212 (e.g., a wheel or roller). A haptic output device may be configured to rotate the rotatable component 212. In one such embodiment, haptic output device comprises a motor. The computing device 201 may actuate the motor to cause the rotatable component 212 to roll, e.g., along a surface 214. This may move the electronic device 204 along the surface 214. In another embodiment, the haptic output device vibrates the rotatable component (e.g., at high frequencies). The vibrations may overcome friction forces between the rotatable component 212 and the surface 214. This may allow the rotatable component 212 to roll along the surface 214 (e.g., as a result of gravitational forces).

In some embodiments, the computing device 201 outputs a haptic effect configured to simulate a physical sensation. For example, the electronic device 204 may output a website (e.g., a news website) via a display. The electronic device 204 may detect a user interaction (e.g., a tap, touch, swipe, two-finger pinch, or a gesture) with the touch-sensitive surface 203. For example, the user interaction may comprise the user pressing a location on the touch-sensitive surface 203 associated with a website link. In some embodiments, the electronic device 204 transmits a signal associated with the user interaction to the computing device 201. In such an embodiment, the computing device 201 may receive the signal and output a haptic effect. For example, the computing device 201 may output a haptic effect configured to cause a haptic output device to rapidly retract and expand holder component 210. In some embodiments, this may cause the entire touch-sensitive surface 203, or a portion of the touch-sensitive surface 203 (e.g., the portion of the touch-sensitive surface 203 contacted by the user), to move. For example, this may cause the entire touch-sensitive surface 203 to move away from and back toward a user's finger. In some embodiments, this back-and-forth motion may simulate a button press.

As another example, in some embodiments, the computing device 201 outputs a haptic effect configured to simulate motion. For example, the electronic device 204 may execute a game or virtual simulation. For instance, the electronic device 204 may be executing a game in which the user is on a virtual pirate ship. In such an embodiment, upon the user contacting the touch-sensitive surface 203 with a finger, the computing device 201 may output a haptic effect configured to simulate waves in the ocean. For example, the computing device 201 may repeatedly retract and expand the holder component 210 at a rate similar to the up-and-down motion of a boat traversing waves.

In some embodiments, the computing device 201 outputs confirmatory haptic effects. For example, in the above pirate ship embodiment, the computing device 201 may output a haptic effect responsive to the user tapping a virtual weapon (e.g., a virtual gun) on the touch-sensitive surface 203. In one such embodiment, the haptic effect comprises a vibration. The user may perceive the haptic effect through the electronic device 204, e.g., due to the coupling between the holder 202 and the electronic device 204. For example, the holder 202 may output vibrations to the electronic device 204, which may cause the electronic device 204 to vibrate. The user may perceive vibrations while contacting the touch-sensitive surface 203 with a finger. In some embodiments, the haptic effect may confirm to the user that the electronic device 204 received the user input (e.g., the weapon selection).

In some embodiments, the computing device 201 may detect a user interaction with the electronic device 204 via one or more sensors and output an associated haptic effect. For example, the computing device 201 may comprise an accelerometer and/or a pressure sensor. In one such embodiment, the accelerometer and/or pressure sensor may be coupled to the pivotable component 206 (e.g., between the pivotable component 206 and the electronic device 204). In some embodiments, upon a user interacting with (e.g., tapping, touching, or gesturing on) the electronic device 204, the computing device 201 outputs an associated haptic effect. For example, upon a user tapping on the electronic device 204 (e.g., the touch-sensitive surface 203), the computing device 201 may detect the tap (e.g., based on signals from the accelerometer and/or pressure sensor) and output an associated haptic effect comprising, e.g., a vibration.

In some embodiments, the electronic device 204 may transmit signals to the computing device 201 to activate or deactivate one or more "haptic modes" executable via the computing device 201. A haptic mode may comprise an operational state in which the computing device 201 detects a user interaction with the electronic device 204 (e.g., via sensors) and outputs an associated haptic effect. The haptic effect may depend on the particular haptic mode. For example, the electronic device 204 may output a virtual object (e.g., a virtual slider) on a display. The electronic device 204 may transmit a signal to the computing device 201 that causes the computing device 201 to enter a "detent" haptic mode. Based on the haptic mode, the computing device 201 may detect the user interacting with the virtual widget (e.g., sliding the virtual slider) and output a haptic effect comprising, e.g., a detent. This my simulate the feeling of interacting with a physical slider.

As another example, in some embodiments, the electronic device 204 may transmit a signal to the computing device 201 that causes the computing device 201 to enter a "confirmatory" haptic mode. Based on the haptic mode, the computing device 201 may detect the user interacting with the virtual object (e.g., tapping on the virtual slider) and output a haptic effect comprising, e.g., a vibration. This may confirm to the user that the computing device 201 detected the user input. In some embodiments, using the computing device 201 to detect user interactions and/or output haptic effects can reduce the computational load on the electronic device 204 (e.g., the electronic device's processor). This may improve the efficiency of the electronic device 204. Further, in some embodiments, using the computing device 201 to detect user interactions and/or output haptic effects may also improve haptic effect rendering by, e.g., reducing latency resulting from communicating between the electronic device 204 and the computing device 201.

Figure 3A:
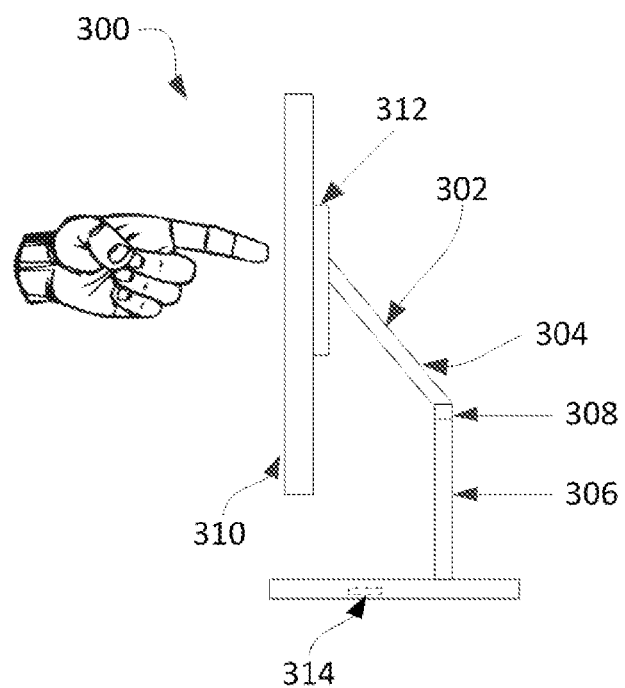
FIG. 3A shows another embodiment of a system for haptically-enabled holders.

FIG. 3A shows another embodiment of a system for haptically-enabled holders. The system 300 comprises an electronic device 310. The electronic device 310 may comprise, for example, a display, television, or a tablet.

The electronic device 310 is coupled to and in communication with a holder 302. In some embodiments, the holder 302 comprises a stand or mounting device (e.g., for mounting the electronic device 310 to a desk or wall). The holder 302 may comprise a computing device 314 configured to output one or more haptic effects via haptic output devices 308, 312.

In some embodiments, the computing device 314 outputs a haptic effect based at least in part on a characteristic (e.g., size, shape, location, texture, color, type, or content) of a virtual object. For example, the electronic device 310 may output a virtual object. The virtual object may comprise one or more textures (e.g., bumpy, smooth, or rubbery). In some embodiments, the computing device 314 outputs one or more haptic effects associated with the texture. For example, the virtual object may comprise a rubber button. Upon a user interacting with the virtual object, the computing device 314 may output a haptic effect via haptic output device 312. The haptic effect may comprise, for example, a simulated rubber texture. In one such embodiment, haptic output device 312 comprises an electrostatic actuator. The computing device 314 may actuate the electrostatic actuator to generate a capacitive coupling between the haptic output device 312 and the user's body (e.g., finger). The user may perceive the capacitive coupling as a haptic effect comprising a rubber texture.

As another example, in some embodiments, the computing device 314 outputs a haptic effect configured to simulate features in a virtual area. For example, the virtual object may comprise a bumpy road over which a virtual car may be driving in a video game. In some embodiments, upon a user interacting with the virtual object, the computing device 314 outputs a haptic effect, e.g., comprising a simulated bumpy texture. In one such embodiment, the computing device 314 outputs the haptic effect via haptic output device 308. For example, the haptic output device 308 may comprise a pivotable component configured to move a first holder component 304 with respect to a second holder component 306. The computing device 314 may cause the haptic output device 308 to move the first holder component 304 toward and away from the user with high frequency. The user may perceive this back-and-forth movement as a bumpy sensation.

In some embodiments, the computing device 314 outputs a haptic effect configured to deform a surface of the holder 302. For example, a user may be contacting the electronic device 310 with high pressure. The electronic device 310 may detect the high pressure and transmit a signal to the computing device 314. In such an embodiment, the computing device 314 may receive the signal and output a haptic effect. For example, the computing device 314 may apply heat or electricity to a haptic output device comprising a shape-memory alloy. This may cause the shape-memory alloy to deform. In one such embodiment, the deformation may cause a holder component 306 to bend, e.g., in a direction away from the user's hand. This may reduce the pressure on the electronic device 310 and prevent the electronic device 310 from breaking.

Figure 3B:
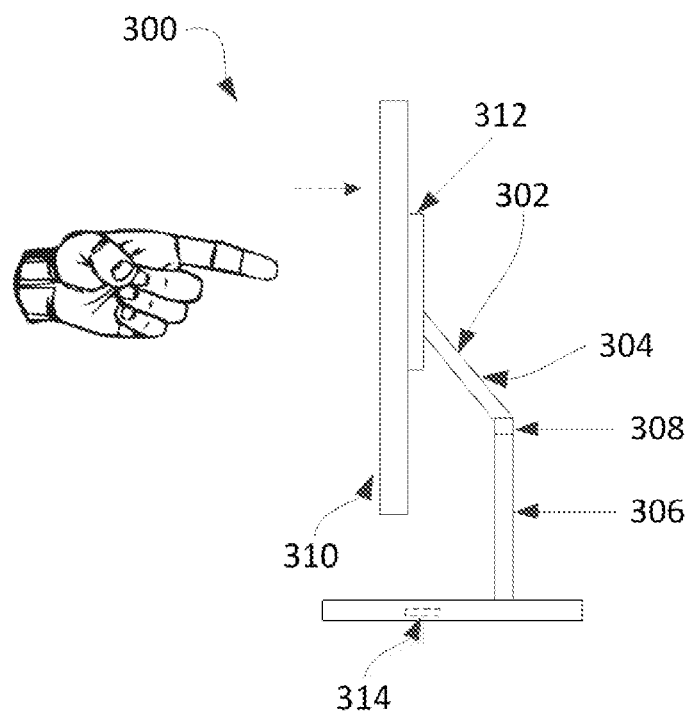
FIG. 3B shows still another embodiment of a system for haptically-enabled holders.
Figure 3C:
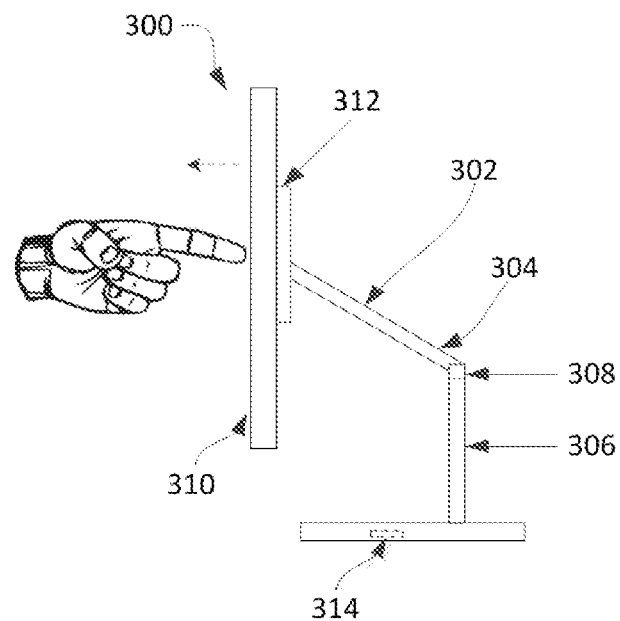
FIG. 3C shows yet another embodiment of a system for haptically-enabled holders.
Figure 3D:
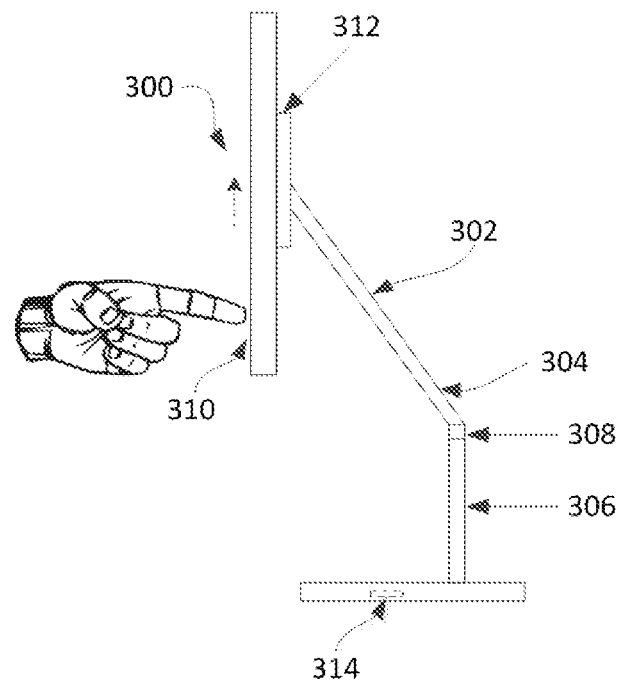
FIG. 3D shows an embodiment of a system for haptically-enabled holders.
Figure 3E:
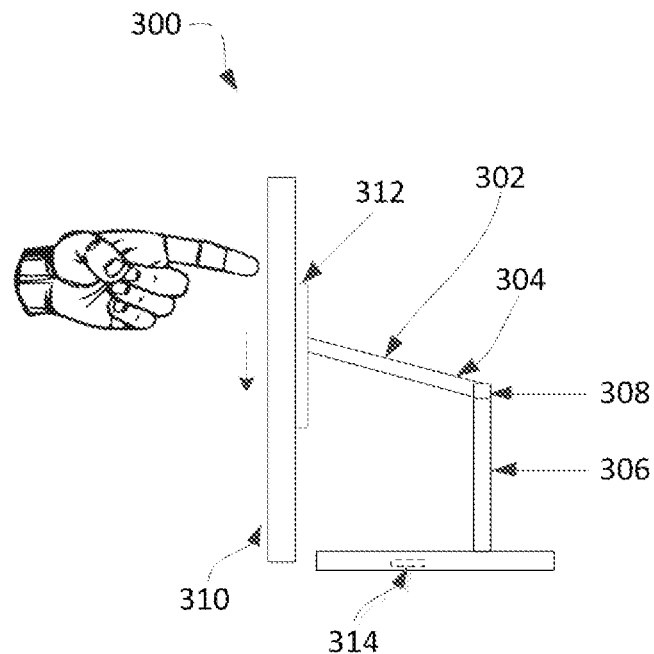
FIG. 3E shows another embodiment of a system for haptically-enabled holders.

In some embodiments, the computing device 314 outputs haptic effects to make user interaction with the electronic device 310 more challenging. For example, the electronic device 310 may be executing a video game. The user may need to, for example, tap the location of a virtual object output on the display before the virtual object disappears and reappears in a new location. In some embodiments, the computing device 314 outputs a haptic effect, e.g., configured to cause the haptic output device 308 to pivot or rotate the first holder component 304 with respect to the second holder component 306. This may move the electronic device 310 in various directions. For example, the haptic effect may cause the electronic device 310 to move away from the user, e.g., as shown in FIG. 3B, and/or toward the user, e.g., as shown in FIG. 3C. In some embodiments, the haptic effect may cause the electronic device 310 to move upward with respect to the user, e.g., as shown in FIG. 3D, and/or downward with respect to the user, e.g., as shown in FIG. 3E. In other embodiments, the haptic effect may cause the electronic device 310 to move right or left with respect to the user, e.g., the directions into and out of the page, respectively. In still other embodiments, the haptic effect may cause the electronic device 310 to rotate, e.g., about the second holder component 306. In some embodiments, these movements may make the video game more challenging for the user, output many different types of effects, or be used to simulate interactions with the user.

Figure 4:
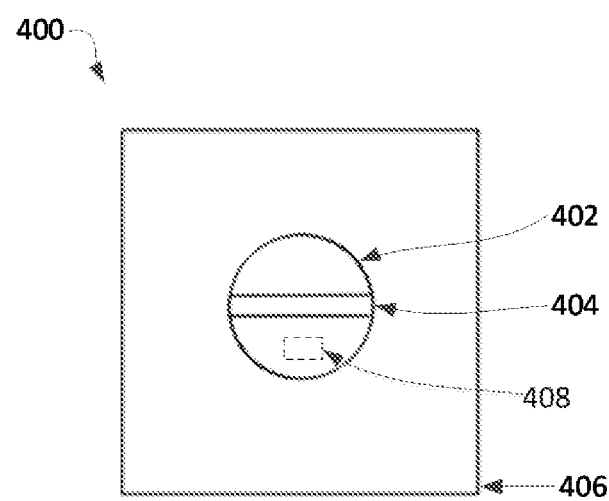
FIG. 4 shows still another embodiment of a system for haptically-enabled holders.

FIG. 4 shows still another embodiment of a system for haptically-enabled holders. In the embodiment shown in FIG. 4, the system 400 is depicted from a back perspective view. The system 400 comprises an electronic device 406 (e.g., a tablet or e-reader) coupled to a holder 402. The holder 402 may be configured such that a user can grip the holder 402 with a body part (e.g., hand). In some embodiments, the holder 402 comprises a strap 404. The user may hold the strap 404 or place a hand between the strap 404 and the body of the holder 402. This may help secure the user's hand to the holder 402.

In some embodiments, the holder 402 is rotateably coupled to (e.g., capable of rotating with respect to) the electronic device 406. This may allow the electronic device 406 to rotate with respect to the holder 402. A haptic output device (not shown) may be configured to cause the electronic device 406 to rotate with respect to the holder 402. In one such embodiment, the haptic output device comprises a motor configured to rotate the electronic device 406 with respect to the holder 402.

For example, the electronic device 406 may output a virtual fishing game via touch-screen display. The virtual fishing game may include a virtual stream with running water. The electronic device 406 may detect the user interacting with a location on the touch-screen display associated with the virtual stream. In some embodiments, based on the interaction, the electronic device 406 may transmit a signal to the computing device 408. In such an embodiment, the computing device 408 may receive the signal and output a haptic effect, e.g., a haptic effect configured to simulate the flow of water in a stream. In one embodiment, the haptic output device outputs the haptic effect by rotating the electronic device 406 clockwise and counterclockwise over short distances (e.g., 3-4 degrees) with respect to the holder 402. The user may perceive this back-and-forth motion against the user's finger as simulating running water.

In some embodiments, the computing device 408 may transmit a signal associated with a haptic effect to the electronic device 406. For example, the computing device 408 may transmit a signal associated with a haptic effect that the computing device 408 is outputting, or is going to output, to the electronic device 406. In some embodiments, the electronic device 406 may receive the signal and execute a function based on the signal. For example, in the above fishing game embodiment, upon the computing device 408 rotating the electronic device back-and-forth, e.g., to simulate running water, the computing device 408 may transmit signals associated with the haptic effect to the electronic device 406. In one such embodiment, the electronic device 406 may receive the signals and, e.g., update a display. For example, the electronic device 406 may update the display to simultaneously rotate all the virtual objects output on the display, e.g., in a direction opposite to the direction in which the electronic device 134 is physically rotating. This may cause the user to perceive the virtual objects output on the display as staying stationary as the electronic device 134 physically rotates. For example, in some embodiments, the rotation of the virtual objects may "cancel out" the physical rotation of the electronic device 406 such that the user perceives the virtual objects as remaining stationary.

In some embodiments, the computing device 408 outputs haptic effects configured to, e.g., resist a user's manipulation of the electronic device 406. For example, the electronic device 406 may be executing a virtual car racing game. The user may hold the holder 402 with one hand and steer the virtual car by rotating the electronic device 406 about the holder 402. For instance, a sensor associated with the electronic device 406 may detect that the user is rotating the electronic device 406 counterclockwise and turn the virtual car left. The electronic device 406 may detect that the user is rotating the electronic device 406 clockwise and turn the virtual car right. In some embodiments, upon the occurrence of an event, the computing device 408 outputs a haptic effect configured to prevent the user from rotating the electronic device 406. For example, upon the virtual car impacting a wall on the left side, the computing device 408 may output a haptic effect, e.g., configured to resist a counterclockwise rotation of the electronic device 406. In some embodiments, the computing device 408 outputs the resistance via a brake or another passive haptic output device.

In some embodiments, the computing device 408 outputs haptic effects configured to modulate a characteristic (e.g., magnitude, duration, or frequency) of a haptic effect output from the electronic device 406. For example, the electronic device 406 may comprise a smart phone. Upon the electronic device 406 receiving a phone call (e.g., from a user's friend), the electronic device 406 may output a haptic effect comprising a vibration. In some embodiments, the computing device 408 detects the haptic effect output by the electronic device 406 (e.g., via an accelerometer or a signal associated with the haptic effect transmitted by the electronic device 406). Further, in some embodiments, the computing device 408 outputs a haptic effect configured to modulate a characteristic of the vibration.

For example, in one embodiment, if the caller is of high importance, the computing device 408 outputs a haptic effect configured to increase the rigidity of the holder 402. In such an embodiment, the holder 402 may comprise a rheological fluid or smart gel which the computing device 408 may actuate to increase the rigidity of the holder 402. This may allow the vibrations from the electronic device 406 to be transmitted to the user's hand (e.g., holding the holder 402) with minimal impedance. In some embodiments, if the caller is of low importance, the computing device 408 outputs a haptic effect configured to decrease the rigidity of the holder 402. This may cause the holder 402 to dampen the magnitude of the vibrations from the electronic device 406. In this manner, the computing device 408 may control the magnitude of the vibrations perceived by the user (e.g., based on the importance of an event).

Figure 5:
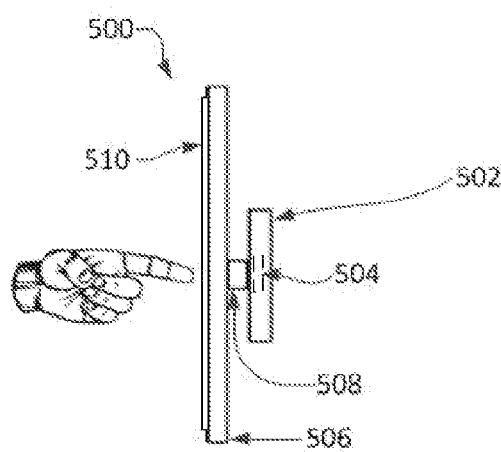
FIG. 5 shows yet another embodiment of a system for haptically-enabled holders.

FIG. 5 shows yet another embodiment of a system for haptically-enabled holders. The system 500 comprises an electronic device 506 coupled to a holder 502. The electronic device 506 may be coupled to the holder 502 by a haptic output device 508. In some embodiments, the haptic output device 508 is configured to rotate the electronic device 506 with respect to the holder 502. Additionally or alternatively, the haptic output device 508 may be configured to move the electronic device 506 toward or away from the holder 502. For example, in some embodiments, the haptic output device 508 may comprise a smart gel, rheological fluid, or a linear actuator. Upon actuation, the haptic output device 508 may be configured to expand or contract to move the electronic device 506 toward or away from the holder 502.

In some embodiments, the electronic device 506 outputs a virtual map on a display (e.g., internal or external to the electronic device 506). A user may interact with the virtual map by moving a finger along a touch-sensitive surface 510. In some embodiments, the electronic device 506 detects the user interaction and transmits one or more signals to computing device 504. The computing device 504 may receive the signal and output a haptic effect. For example, the computing device 504 may output haptic effects configured to simulate the topography of map locations contacted by the user's finger. In one embodiment, the computing device 504 causes the haptic output device 508 to expand and contract to simulate higher and lower elevations, respectively. This may provide information to the user, for example, information about the physical terrain and/or topography of a map location.

In some embodiments, the computing device 504 outputs haptic effects configured to move (e.g., "snap") the electronic device 506 to a new position (and/or lock the electronic device 506 in the new position). For example, the electronic device 506 may be executing a drawing application. The electronic device 506 may detect a user moving a finger along the surface of touch-sensitive surface 510 and output a line associated with the path of the user's finger. In some embodiments, upon the user pressing on the touch-sensitive surface 510 (e.g., pushing the electronic device 506 to the right of the page) with an amount of pressure above a threshold, the electronic device 506 transmits a signal to the computing device 504. In such an embodiment, the computing device 504 may receive the signal and cause the haptic output device 508 to contract. This may "snap" the electronic device 506 to a new position. In some embodiments, the electronic device 506 may detect the new position (or the amount of pressure) and change to another input mode, such as an erasing mode. This may allow the user to, for example, erase portions of the drawing by moving a finger along the touch-sensitive surface 510.

Further, in some embodiments, upon the user pulling the electronic device 506 away from the holder 502 (e.g., to the left of the page), the electronic device 506 transmits a signal to the computing device 504. In such an embodiment, the computing device 504 may receive the signal and cause the haptic output device 508 to expand. This may "snap" the electronic device 506 to another position. In some embodiments, the electronic device 506 may detect the new position and change to another input mode, such as a pan or zoom mode. This may allow the user to, for example, pan or zoom in or out on the drawing by interacting with the touch-sensitive surface 510. In some embodiments, responsive to the user tapping on (e.g., double tapping on) the touch-sensitive surface 510, the computing device 504 outputs a haptic effect. The haptic effect may be configured to, e.g., snap the electronic device 506 back to its original position (which may be associated with a drawing input mode).

In some embodiments, the computing device 504 outputs haptic effects associated with an input mode or function executing on the electronic device 506. For example, in the above drawing embodiment, the electronic device 506 may detect a user interaction and switch to the erasing mode. Upon the electronic device 506 switching to the erasing mode, the electronic device 506 may transmit a signal associated with the erasing mode to the computing device 504. The signal may be configured to cause the computing device 504 to output a haptic effect (e.g., to "snap" the electronic device 506 to a new position). For example, based on the erasing mode, the haptic effect may comprise a pulsed vibration. If the electronic device 506 switches to another mode, e.g., drawing mode, the computing device 504 may output a different haptic effect (e.g., a short vibration) or no haptic effect at all.

Figure 6:
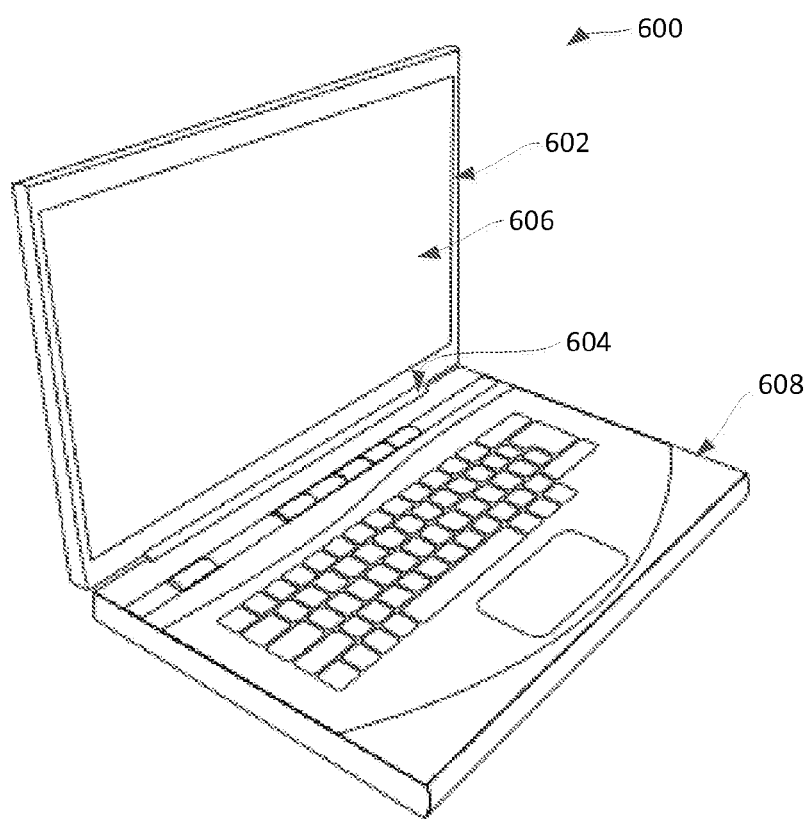
FIG. 6 shows another embodiment of a system for haptically-enabled holders.

FIG. 6 shows another embodiment of a system for haptically-enabled holders. The system 600 comprises an electronic device 602. In this example, the electronic device 602 comprises a laptop computer. The electronic device 602 may comprise one or more pivotable or rotatable components 604 (e.g., hinges or joints) coupling two or more components of the electronic device 602. For example, in the embodiment shown in FIG. 6, a hinge couples a display 606 to a base 608 for opening and closing the electronic device 602.

In some embodiments, the pivotable or rotatable component 604 comprises, or is coupled to, a haptic output device (not shown). The haptic output device may comprise, for example, a motor, a shape-memory alloy, a brake, and/or an electromagnet. In some embodiments, the haptic output device manipulates the pivotable or rotatable component 604 to output the one or more haptic effects.

For example, the display 606 may comprise a touch-screen display. The electronic device 602 may output a virtual object on the display 606 comprising, e.g., a spring. In some embodiments, the electronic device 602 detects a user interaction with the virtual object (via the touch-screen display) and outputs a haptic effect. For example, upon the user pressing against the display 606 on a location associated with a virtual spring, the electronic device 602 may output a haptic effect, e.g., configured to resist the press. In one embodiment, the haptic effect is configured to resist the press with an amount associated with the spring constant of the virtual spring. In some embodiments, the electronic device 602 outputs this haptic effect by actuating a motor coupled to the pivotable or rotatable component 604 in a direction opposing the force output by the user on the display 606. In other embodiments, the electronic device 602 outputs this haptic effect by applying a brake or actuating a rheological fluid layer (e.g., adjacent to the pivotable or rotatable component 604), e.g., such that friction opposes the force output by the user. Further, in some embodiments, upon the user removing pressure from the display 606, the electronic device 602 outputs another haptic effect. For example, the electronic device 602 may output a haptic effect configured to move the display 606 forward to its starting position (e.g., to spring the display 606 back to its starting position).

Figure 7:
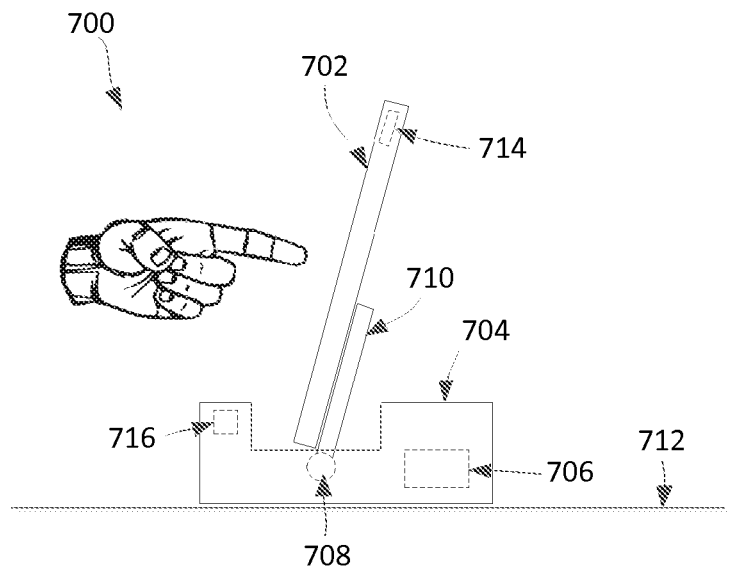
FIG. 7 shows still another embodiment of a system for haptically-enabled holders.

FIG. 7 shows still another embodiment of a system for haptically-enabled holders. The system 700 comprises an electronic device 702 (e.g., a MP3 player, smartphone, or a digital media player) coupled to a holder 704. In this example, the holder 704 comprises a docking station. The holder 704 further comprises a computing device 706 in communication with the electronic device 702 and configured to output a haptic effect via haptic output device 708.

In the embodiment shown in FIG. 7, the haptic output device (e.g., a motor, shape memory alloy, smart gel layer, or rheological fluid layer) is coupled to an intermediary component 710. The intermediary component 710 may be coupled to the electronic device 702. In some embodiments, the haptic output device expands, contracts, or rotates to output a haptic effect. For example, the haptic output device may output a haptic effect by rotating the intermediary component 710 counterclockwise, which may move the electronic device 702 to the left. In other embodiments, the haptic output device is not coupled to an intermediary component 710, and may instead be directly coupled to the electronic device 702.

In some embodiments, the computing device 706 outputs a haptic effect configured to make it easier for the user to interact with the electronic device 702. For example, the holder 704 may be positioned on a surface 712, e.g., in an automobile. In one embodiment, the holder 704 is positioned on the center console of an automobile. Upon the user contacting the electronic device 702 (e.g., to change a song on a playlist) the computing device 706 may output a haptic effect. For example, the computing device 706 may cause the haptic output device 708 to rotate, moving the electronic device 702 toward the user. This may make it easier for the user to interact with the electronic device 702, e.g., while keeping the user's eyes on the road.

In some embodiments, the computing device 706 outputs a haptic effect configured to make it more difficult for the user to interact with the electronic device 702. For example, in some embodiments, the electronic device 702 and/or computing device 706 comprises a sensor, such as a camera, range detector, depth sensor, etc. In such an embodiment, the electronic device 702 and/or computing device 706 analyzes signals from the sensor (e.g., analyze images from a camera) to determine if the user is approaching or otherwise interacting with the electronic device 702. If so, the computing device 706 may output a haptic effect, e.g., configured to make it more difficult for the user to interact with the electronic device 702.

For example, the holder 704 may be positioned in a user's house, e.g., on the nightstand next to the user's bed. The electronic device 702 may be executing an alarm, e.g., configured to wake the user up in the morning. At the designated time, the electronic device 702 may sound the alarm. In some embodiments, the electronic device 702 detects the user pressing a "snooze" button and silences the alarm for five minutes. Five minutes later, the alarm may again sound. In some embodiments, the electronic device 702 may detect the user reaching out to press the "snooze" button again (e.g., by analyzing camera images) and cause the computing device 706 to output a haptic effect. For example, the computing device 706 may output a haptic effect configured to move the electronic device 702 away from, or out of reach of, the user. This may make it more difficult for the user to press the "snooze" button.

Illustrative Methods for Haptically-Enabled Holders

Figure 8:
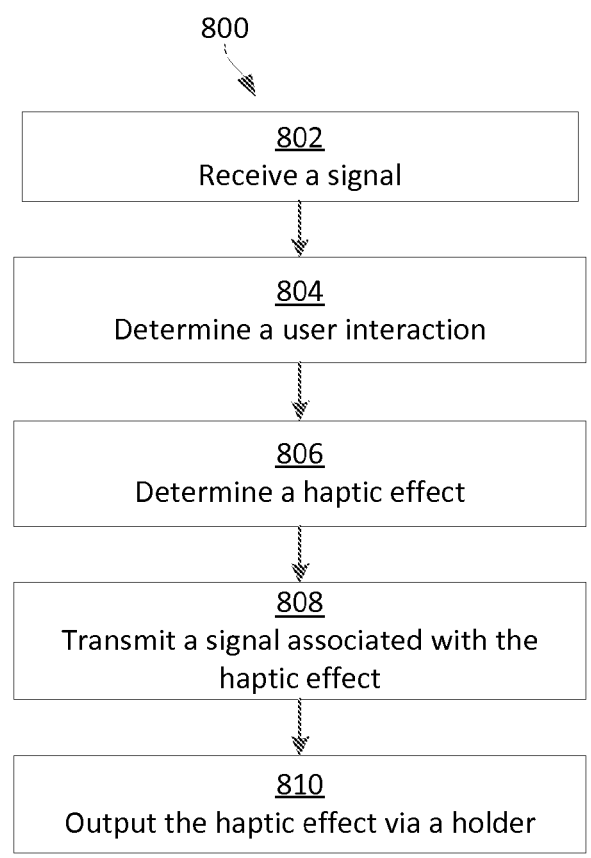
FIG. 8 is a flow chart of steps for performing a method for providing haptically-enabled holders according to another embodiment.

FIG. 8 is a flow chart of steps for performing a method for providing object manipulation with haptic feedback according to one embodiment. In some embodiments, the steps in FIG. 8 may be implemented in program code that is executed by a processor, for example, the processor in a general purpose computer, a mobile device, or a server. In some embodiments, these steps may be implemented by a group of processors. In some embodiments one or more steps shown in FIG. 8 may be omitted or performed in a different order. Similarly, in some embodiments, additional steps not shown in FIG. 8 may also be performed. The steps below are described with reference to components described above with regard to computing device 101 shown in FIG. 1.

The method 800 begins at step 802 when the processor 102 receives a signal. In some embodiments, the processor 102 may receive the signal from one or more electronic devices 134. For example, upon the occurrence of an event, an electronic device 134 may transmit a signal (e.g., via a wired or wireless interface) associated with the event to the computing device 101. The computing device 101 may receive the signal (e.g., via network 110) and transmit the signal to the processor 102.

In some embodiments, the processor 102 may receive the signal from the sensors 130. The signal may comprise data associated with a user interaction with the holder 100. For example, in one embodiment, the data may comprise accelerometer data associated with the user lifting or otherwise manipulating the holder 100.

In some embodiments, the processor 102 receives a signal from the I/O components 112. In such an embodiment, the signal may be associated with a user interaction with a user interface device (e.g., a button, switch, lever, or knob) associated with the holder 100 and/or electronic device 134. For example, the holder 100 may comprise a docking station with one or more user interface devices (e.g., buttons, switches, levers, or joysticks). The user interface devices may comprise, for example, a power button, a volume knob (e.g., if the docking station can play music), a selector switch (e.g., for determining which of a plurality of connected monitors or other electronic devices should be used for outputting data), etc. In some embodiments, upon a user interacting with (e.g., rotating) a volume knob, the holder 100 receives a signal from the volume knob via the I/O components 112.

The method continues at step 804 when the processor 102 determines a user interaction. The processor 102 may determine a characteristic of the user input based on the signal. For example, electronic device 134 and/or holder 100 may comprise one or more user interface devices. Upon a user interacting with the user interface device, the electronic device 134 and/or holder 100 may transmit a signal associated with the user interaction to the processor 102. The processor 102 may analyze the signal to determine a characteristic (e.g., a type, location, direction, speed, pressure, or gesture) associated with the user interaction.

For example, in some embodiments, the electronic device 134 and/or holder 100 comprises a touch-sensitive surface (e.g., a touch-screen display). Upon a user interacting with the touch-sensitive surface (e.g., at a location associated with a virtual button), the touch-sensitive surface may transmit a signal to the processor 102. In some embodiments, the processor 102 analyzes the signal from the touch-sensitive surface to determine a location on the touch-sensitive surface associated with the user interaction. For example, if virtual buttons output on a display are mapped to locations on the touch-sensitive surface, the processor 102 may analyze the signal from the touch-sensitive surface to determine if the user interacted with a virtual button. In some embodiments, the processor 102 analyzes the signal from the touch-sensitive surface to determine whether the user performed a gesture (e.g., a swipe or two-finger pinch) on the surface of the touch-sensitive surface. For example, the processor 102 may analyze the direction, speed, and/or location associated with the user interaction to determine whether (and which) gesture the user performed.

In some embodiments, the electronic device 134 and/or holder 100 comprises one or more buttons or switches. Upon a user interacting with (e.g., pressing or switching) the one or buttons or switches, the one or more buttons or switches may transmit a signal to the processor 102. In such an embodiment, each button and/or switch may be configured to transmit a different signal to the processor 102. The processor 102 may receive a signal and determine, based on the characteristics of the signal, the button and/or switch with which the user interacted.

The method continues at step 806 when the processor determines a haptic effect. In some embodiments, the processor 102 determines a haptic effect based on a position of the electronic device 134 and/or the holder 100, and/or a previously output haptic effect. For example, upon the occurrence of an event (e.g., the user pressing a button on the electronic device 134), the processor 102 may determine a haptic effect configured to orient the electronic device 134 at a specific angle (e.g., 30 degrees) with respect to a surface. Upon the occurrence of another event (e.g., the user again pressing the button on the electronic device 134), the processor 102 may determine that the electronic device 134 is already positioned at the specific angle. Thus, the processor 102 may not output a haptic effect.

As another example, in some embodiments, upon the occurrence of an event (e.g., the user interacting with a virtual object output via the electronic device 134), the processor 102 may determine a first haptic effect configured to rotate the electronic device 134 to a first position (e.g., 30 degrees) about an axis (e.g., an axis perpendicular to or lateral to the surface of the electronic device 134). Upon the occurrence of another event (e.g., the user interacting with another virtual object output via the electronic device 134), the processor 102 may determine that the electronic device 134 should be rotated to a second position (e.g., 45 degrees) about the axis. However, because the electronic device 134 may already be in the first position (e.g., as a result of the first haptic effect), the processor 102 may determine a second haptic effect configured to rotate the electronic device 134 an amount that is the difference (e.g., 15 degrees) between the two positions. In this manner, the processor 102 may be able to calculate and/or otherwise determine a haptic effect based on a previously output haptic effect, the position of the electronic device 134, and/or the position of the holder 100.

In some embodiments, the processor 102 determines a haptic effect configured to move the electronic device 134 in multiple (e.g., two or three) degrees of freedom. For example, the electronic device 134 may be executing a flight simulator video game. As the virtual pane flies through the air, the processor 102 may determine one or more haptic effects configured to substantially simultaneously rotate and translate the electronic device 134. This may simulate the feel of flying as the virtual plane moves in three dimensions.

In some embodiments, the processor 102 determines a haptic effect based on a characteristic of the electronic device 134 and/or the holder 100. In such an embodiment, the processor 102 may determine (e.g., via sensors 130) a material comprised within the electronic device 134 and/or the holder 100. The processor 102 may determine a haptic effect based on the material. For example, in one embodiment, the computing device 101 may comprise a sensor 130 that includes an accelerometer. The computing device 101 may vibrate (e.g., via the haptic output device 118) the holder 100 and/or the electronic device 134 and, based on signals from the accelerometer, the processor 102 may determine an approximate fundamental or normal frequency of the electronic device 134 and/or the holder 100. Based on this data, the processor 102 may determine a haptic effect. For example, the processor 102 may determine a haptic effect comprising a vibration with a frequency that is the fundamental frequency of the electronic device 134 and/or the holder 100.

In another embodiment, the computing device 101 may comprise a sensor 130 that includes a camera. The computing device 101 may take pictures of the holder 100 and/or the electronic device 134 and analyze the pictures to determine one or more materials comprised within the holder 100 and/or the electronic device 134. For example, the computing device 101 may analyze an image from sensor 130 and determine that the electronic device 134 comprises rubber, glass, and metal. The processor 102 may determine one or more haptic effects associated with these materials. For example, the processor 102 may consult a lookup table and determine a haptic effect comprising a high-magnitude vibration if the material comprises, e.g., rubber. In some embodiments, rubber may dampen vibrations, and thus the high-magnitude of the vibrations may allow the user to more readily perceive the vibrations.

In some embodiments, the processor 102 determines a haptic effect based on a characteristic associated with a virtual object. For example, the electronic device 134 may detect a user interaction with a virtual object (e.g., an image output on a display) and transmit a signal associated with the virtual object to the processor 102. In some embodiments, the processor 102 may determine the haptic effect based on the height, width, shape, color, location, function, or texture of the virtual object. For example, if the virtual object comprises a wood desk, the processor 102 may determine a haptic effect comprising a wood texture.

In some embodiments, the processor 102 determines a haptic effect based on the characteristic associated with a user interaction with the electronic device 134 and/or the holder 100. In such an embodiment, the processor 102 may determine the haptic effect based the type, location, duration, or other characteristics of the user interaction. For example, the processor 102 may determine a haptic effect comprising a vibration if the user holds a button on the electronic device 134 for a period of time above a threshold. As another example, the processor 102 may determine a haptic effect if the user interaction comprises a swipe along a touch-sensitive surface associated with the electronic device 134, and no haptic effect if the user interaction comprises tapping on the touch-sensitive surface. In some embodiments, the processor 102 determines a haptic effect based on a signal from the I/O components 112. For example, a user may interact with a user interface device (e.g., rotating a volume knob) associated with the holder 100. In some embodiments, the processor 102 may receive an associated signal from the user interface device via the I/O components 112 and determine a haptic effect based on the signal. The haptic effect may comprise, e.g., detents. This may, for example, simulate the feeling of a physical rotary knob.

In some embodiments, the computing device 101 may store associated "haptic profiles" in which a user can determine and save in memory 104 a "profile" of the haptic effects the user would like associated with particular events. For example, in one embodiment, a user can select from a list of options which haptic effect the user would like associated with the an event comprising low battery, receiving a phone call, or contact with a user interface component. In some embodiments, the list may comprise, for example, haptic effects such as high-magnitude vibration, pulsed vibration, or a low-magnitude vibration. In some embodiments, the processor 102 may consult with the user's haptic profile to determine which haptic effect to generate. For example, if the user's haptic profile associates an explosion in a video game with a haptic effect comprising a low-frequency vibration, in response to an explosion occurring in a video game (e.g., being played on the electronic device 134), the processor 102 may determine a haptic effect comprising a low-frequency vibration.

In some embodiments, the processor 102 determines a plurality of haptic effects. Each of the plurality of haptic effects may be associated with a different characteristic of a virtual object and/or a user interaction (e.g., with the electronic device 134 and/or the holder 100). For example, the electronic device 134 may output a virtual slingshot on a touch-screen display. Upon the pressing against the touch-screen display on a location associated with the virtual slingshot, the processor 102 may determine a haptic effect, e.g., associated with the texture of the band of the virtual slingshot (e.g., a rubber texture). The processor 102 may generate the haptic effect by, for example, actuating an electrostatic actuator coupled to the holder 100 and positioned behind the touch-screen display. The processor 102 may also determine another haptic effect, e.g., configured to resist the user's press against the touch-screen display. The haptic effect may be configured to resist against the user's press with an amount associated with the elasticity of the band. In one such embodiment, the processor 102 may generate the haptic effect by, for example, actuating two or more sliding components of a stand (e.g., holder components 208, 210 of FIG. 2). The processor 102 may cause the components to slide at a rate based on, e.g., the elasticity of the band and the pressure on the touch-screen display. In some embodiments, the multiple haptic effects may provide a more realistic and immersive representation of the virtual object (e.g., interacting with a slingshot).

In some embodiments, the processor 102 determines that a haptic effect associated with one electronic device 134 has a higher priority than a haptic effect associated with another electronic device 134. In such an embodiment, the processor 102 may be able to receive signals from a plurality of electronic devices 134. For example, the holder 100 may be configured to couple with multiple electronic devices 134 (e.g., the holder 100 may comprise a docking station for both a laptop computer and a smart phone). The processor 102 may receive a plurality of signals from the multiple electronic devices 134 associated with events. In some embodiments, a user may be able to input a priority order (e.g., via user interface devices coupled to I/O components 112) among the multiple electronic devices 134. In other embodiments, the processor 102 may determine the priority order based on, e.g., a characteristic (e.g., the type or location) of the multiple electronic devices 134.

For example, based on user preferences stored in memory 104, the processor 102 may determine that haptic effects associated with the smart phone have a higher priority than haptic effects associated with the laptop computer. For instance, the holder 100 may comprise a docking station for both a laptop computer and a smart phone. The laptop may be executing a video game, e.g., a hockey game. Upon the user's virtual player getting hit with a hockey stick, the computing device 101 may be configured to output a low-magnitude vibration. However, substantially simultaneously to the hit, the smart phone may receive a phone call. Upon receiving a phone call, the computing device 101 may be configured to output a high-frequency vibration. The processor 102 may determine that the high-frequency vibration has a higher priority than the low-magnitude vibration, e.g., due to the high-frequency vibration being associated with the smart phone, and thus only output the high-frequency vibration (or output the high-frequency vibration prior to the low-magnitude vibration).

In some embodiments, the processor 102 determines that a specific haptic effect has a higher priority than another haptic effect, and thus to output only the higher priority effect. For example, in the processor 102 may receive two or more successive signals from the electronic device 134 associated with events. The processor 102 may determine that a haptic effect associated with one event has a higher priority than a haptic effect associated with another event. For example, the processor 102 may determine that a haptic effect associated with low battery has a higher priority than a haptic effect associated with clicking a link on a website. The processor 102 may thus only output the low battery haptic effect. Alternatively, the processor 102 may determine that only the most intense effect should be output. Thus, in some embodiments, the processor may determine a low intensity vibration and a high intensity vibration, but output only the high intensity vibration.

The method 800 continues at step 808 when the processor 102 transmits a signal associated with the haptic effect. The processor 102 may be in wired or wireless communication with the haptic output device 118, and thus may transmit the haptic signal via wires or wirelessly. In some embodiments, the signal comprises high-level commands to be interpreted by the haptic output device 118 to generate the haptic effect. In other embodiments, the signal may comprise low-level waveforms configured to directly cause the haptic output device 118 to output the haptic effect.

The method 800 continues at step 810 when the computing device 101 outputs the haptic effect (e.g., via the holder 100). The haptic output device 118 receives a signal and outputs the haptic effect. The haptic effect may comprise a texture (e.g., sandy, bumpy, or smooth), a vibration, a change in a perceived coefficient of friction, a change in temperature, a stroking sensation, an electro-tactile effect, or a deformation (i.e., a deformation of a surface associated with the holder 100). In some embodiments, the haptic effect comprises a kinesthetic haptic effect.

In some embodiments, the haptic output device 118 may generate the haptic effect by sliding and/or pivoting two or more components of the holder 100 with respect to one another. For example, the haptic output device 118 may output a haptic effect configured to simulate a button press by, e.g., sliding two stand components with respect to one another. For instance, the haptic output device 118 may slide two stand components to rapidly shorten than elongate the stand. This shortening and elongation may rapidly move the electronic device 134, e.g., away from the user and back toward the user. The user may perceive this motion as a button press.

In some embodiments, the haptic output device 118 may generate the haptic effect by rotating two or more components of the holder 100 with respect to one another. For example, the haptic output device 118 may output a haptic effect configured to simulate movement of a user's finger across a surface, e.g., by slowly rotating the electronic device 134 while the user contacts the electronic device 134 with a finger. This rotation of the electronic device 134 may cause he user's finger to slide along a surface of the electronic device 134. The user may perceive this sliding motion as the haptic effect.

In some embodiments, the haptic output device 118 may generate the haptic effect by rotating, sliding, pivoting, and/or otherwise manipulating two or more components of the holder 100 and/or the electronic device 134 with respect to one another substantially simultaneously. For example, the haptic output device 118 may output a haptic effect configured to simulate a ship's movement over a wave. In such an embodiment, as a user presses against a surface of the electronic device 134, the haptic output device 118 may generate the haptic effect, in part, by periodically shortening and elongating a length of the stand. This may move the electronic device 134 away from the user and then back toward the user in a periodic motion. Further, the haptic output device may, substantially simultaneously, rotate the electronic device 134 about an axis (e.g., normal to the front surface of the electronic device 134). This may cause the user's finger to slide along a surface (e.g., the front surface) of the electronic device 134. The user may perceive the combined back-and-forth motion of the stand and the rotation motion of the electronic device 134 as simulating, e.g., a ship's movement over a wave.

Advantages of Haptically-Enabled Holders

There are numerous advantages to haptically-enabled holders. Such systems may allow for haptic feedback, even if electronic devices with which the user may interact do not themselves have haptic output devices. For example, an electronic device may be coupled to a stand. The stand may output a vibration to a user upon the user interacting with the electronic device. In this manner, the stand may allow the user to receive haptic feedback, even if the electronic device does not contain a haptic output device. This may increase the number and nature of electronic devices capable of providing haptic feedback to a user. This also reduces the cost of developing and producing electronic devices because such devices may be designed without haptic components found in a holder of the type described herein.

In some embodiments, haptically-enabled holders increase the number of available haptic effects that can be output to a user. For example, an electronic device may comprise a haptic output device only capable of providing vibrations to a user. By coupling the electronic device to a haptically-enabled holder, however, the user may be able to receive a broader range of haptic effects. For example, in some embodiments, the haptically-enabled holder may be able to output haptic effects comprising simulated textures, changes in a perceivable coefficient of friction, stroking sensations, etc. This increased number and variety of haptic effects may provide a more immersive and enhanced user experience.

In some embodiments, haptically-enabled holders can provide information to a user. For example, upon a user interacting with an electronic device (e.g., moving a joystick or pressing a button on the electronic device), the electronic device may transmit a signal to a haptically-enabled holder. The holder may receive the signal and output a haptic effect, e.g., a vibration. The user may be able to perceive the haptic effect through the electronic device. The haptic effect may notify the user that, e.g., the electronic device registered the user interaction.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A holder that is releasably couplable with an electronic device that is separate from the holder, the holder comprising:
   an outer housing;
   a locking device coupled to the outer housing, wherein the locking device includes a releasable coupling that is configured to releasably mechanically couple the outer housing of the holder to an outer surface of the electronic device;

a processor;
a memory device comprising instructions executable by the processor to cause the processor to receive an electronic communication from the electronic device and transmit an electrical signal based on the electronic communication;
a wheel positioned on a bottom of the holder for rolling along a surface on which the holder is placed; and
a motor configured to receive the electrical signal and responsively rotate the wheel along the surface to create a haptic effect perceivable at the electronic device.

2. The holder of claim 1, wherein the holder comprises a stand.

3. The holder of claim 1, wherein the haptic effect comprises translating the entire electronic device in a back-and-forth motion along the surface.

4. The holder of claim 1, wherein the holder further comprises a rotatable component that is positioned to couple with the electronic device and that is rotatable about an axis, and wherein the haptic effect is further created at least in part by:
rotating the electronic device in a predefined amount about the axis by causing the rotatable component to rotate relative to the holder; or
resisting rotation of the electronic device about the axis by resisting rotation of the rotatable component relative to the holder.

5. The holder of claim 4, further comprising a kickstand between the wheel and the rotatable component, wherein the kickstand is configured to move the electronic device in a first direction by expanding in size and move the electronic device in a second direction that is opposite to the first direction by contracting in size.

6. The holder of claim 4, wherein the haptic effect is created at least in part by resisting rotation of the electronic device about the axis by resisting rotation of the rotatable component relative to the holder.

7. The holder of claim 1, wherein the electrical signal is a first electrical signal, and further comprising a sensor configured to detect an object approaching, but not contacting, the electronic device and transmit an associated sensor signal to the processor, wherein the memory device further comprises instructions executable by the processor to cause the processor to:
receive the sensor signal; and
based on the sensor signal, transmit a second electrical signal configured to cause the holder to move the electronic device in a direction away from the object.

8. The holder of claim 7, wherein the second electrical signal is transmitted to the motor, and wherein the second electrical signal is configured to cause the motor to rotate the wheel along the surface such that the holder carries the electronic device in the direction away from the object.

9. The holder of claim 7, wherein the second electrical signal is transmitted to a rotatable component configured to pivot the electronic device in the direction away from the object in response to the electrical signal.

10. The holder of claim 1, wherein the memory device further includes instructions executable by the processor to cause the processor to transmit a signal indicating the haptic effect to the electronic device.

11. The holder of claim 1, further comprising an expandable kickstand, wherein the electrical signal is a first electrical signal, and wherein the memory device further comprises instructions executable by the processor to cause the processor to transmit a second electrical signal to the expandable kickstand to cause the expandable kickstand to lift the electronic device from a prone position to an upright position.

12. The holder of claim 1, further comprising a haptic output device that includes a smart material, a shape memory alloy, or a rheological fluid.

13. The holder of claim 1, wherein the electronic communication is associated with an interaction detected by a touch-sensitive surface of the electronic device.

14. The holder of claim 1, wherein the electronic communication is associated with a game event occurring on the electronic device.

15. The holder of claim 1, wherein the haptic effect comprises simultaneously translating and rotating the electronic device.

16. The holder of claim 1, wherein the electrical signal is a first electrical signal, and further comprising an expandable kickstand, wherein the memory device further comprises instructions executable by the processor to cause the processor to transmit a second electrical signal configured to cause the expandable kickstand to repeatedly expand and contract in size to simulate motion in a video game.

17. The holder of claim 1, wherein the memory device further comprises instructions executable by the processor to cause the processor to:
determine a characteristic of a material of the holder;
determine the haptic effect based at least in part on the characteristic of the holder; and
generate the electrical signal based at least in part on the haptic effect.

18. The holder of claim 17, wherein the characteristic is a fundamental frequency or a normal frequency of the holder.

19. A method of operating a holder that is releasably couplable to an electronic device that is separate from the holder, the method comprising:
receiving, by a processor of the holder, an electronic communication from the electronic device;
transmitting, by the processor and based on the electronic communication, an electrical signal to a motor that is included in the holder; and
rotating, by the motor and based on the electrical signal, a wheel of the holder along a surface on which the holder is placed to create a haptic effect that is perceivable at the electronic device;
wherein an outer housing of the holder is releasably mechanically coupled to an outer surface of the electronic device via a releasable coupling of a locking device.

20. The method of claim 19, wherein the electronic device comprises a mobile phone, a tablet, an e-reader, a laptop computer, a display, a computer monitor, a portable media player, or a portable gaming device.

21. The method of claim 19, wherein the haptic effect comprises translating the entire electronic device in a back-and-forth motion along the surface.

22. The method of claim 19, wherein the electrical signal is a first electrical signal, and further comprising:
receiving, from a sensor, a sensor signal indicating an object is approaching, but not contacting, the electrical device; and
based on the sensor signal, transmitting a second electrical signal configured to cause the holder to move the electronic device in a direction away from the object.

23. The method of claim 22, wherein the second electrical signal is transmitted to the motor, and wherein the second electrical signal is configured to cause the motor to rotate the wheel along the surface such that the holder carries the electronic device in the direction away from the object.

24. The method of claim 22, wherein the second electrical signal is transmitted to a rotatable component configured to pivot the electronic device in the direction away from the object in response to the electrical signal.

25. The method of claim 19, further comprising transmitting a signal indicating the haptic effect to the electronic device.

26. The method of claim 19, wherein the electronic communication is associated with an interaction detected by a touch-sensitive surface of the electronic device.

27. The method of claim 19, wherein the electronic communication is associated with a game event occurring on the electronic device.

28. The method of claim 19, wherein the haptic effect comprises simultaneously translating and rotating the electronic device.

29. The method of claim 19, wherein the haptic effect is created at least in part by resisting rotation of the electronic device about an axis by resisting rotation of a rotatable component relative to the holder.

30. The method of claim 19, further comprising:
determining a characteristic of a material of the holder;
determining the haptic effect based at least in part on the characteristic of the holder; and
generating the electrical signal based at least in part on the haptic effect.

31. The method of claim 30, wherein the characteristic is a fundamental frequency or a normal frequency of the holder.

32. A non-transient computer readable medium comprising program code, which when executed by a processor of a holder is configured to cause the processor to:
receive an electronic communication from an electronic device that is separate from the holder; and
transmit, based on the electronic communication, an electrical signal to a motor that is included in the holder, wherein the motor is configured to receive the electrical signal and rotate a wheel of the holder along a surface on which the holder is placed to create a haptic effect that is perceivable at the electronic device; and
wherein a locking device of the holder includes a releasable coupling that is configured to releasably mechanically couple an outer housing of the holder with an outer surface of the electronic device.

33. The non-transient computer readable medium of claim 32, wherein the haptic effect comprises translating the entire electronic device in a back-and-forth motion.

* * * * *